United States Patent
Hurrell, II et al.

(10) Patent No.: US 6,170,993 B1
(45) Date of Patent: Jan. 9, 2001

(54) BEARING SEPARATOR WITH RANDOM SPACING

(75) Inventors: George Leonard Hurrell, II, Port Clinton; Steven Eugene Meeker, Norwalk; Raymond Beryl Brough, Port Clinton, all of OH (US)

(73) Assignee: General Motors Corporation, Detroit, MI (US)

( * ) Notice: Under 35 U.S.C. 154(b), the term of this patent shall be extended for 0 days.

(21) Appl. No.: 09/212,588

(22) Filed: Dec. 16, 1998

(51) Int. Cl.$^7$ ...................................................... F16C 33/38
(52) U.S. Cl. ........................... 384/524; 384/572; 384/450
(58) Field of Search ...................................... 384/523, 524, 384/525, 526, 527, 528, 529, 530, 531, 532, 533, 534, 572–580, 450

(56) References Cited

U.S. PATENT DOCUMENTS

| | | |
|---|---|---|
| 3,648,377 | 3/1972 | Witzke . |
| 3,830,552 | 8/1974 | Schuller et al. . |
| 3,882,583 * | 5/1975 | Thacker et al. ................. 29/898.061 |
| 3,918,778 * | 11/1975 | Jacobson et al. ..................... 384/523 |
| 4,379,501 | 4/1983 | Hagiwara et al. . |
| 4,523,666 | 6/1985 | Murray . |
| 4,567,975 | 2/1986 | Roll . |
| 5,004,359 * | 4/1991 | Jacobson .......................... 384/576 X |
| 5,022,267 | 6/1991 | Shattuck et al. . |
| 5,678,310 | 10/1997 | Chiba . |
| 5,927,858 * | 7/1999 | Agari ................................. 384/51 X |

* cited by examiner

*Primary Examiner*—Thomas R. Hannon
*Assistant Examiner*—Colby Hansen
(74) *Attorney, Agent, or Firm*—Scott A. McBain

(57) ABSTRACT

A ball bearing has an outer race, an inner race and a plurality of balls disposed between the races. The balls are spaced on a pitch diameter to provide a rolling medium between the races to accommodate differential rotation between the races. The ball spacing is maintained by a separator having a pocket for each ball. The pockets are distributed around the pitch diameter in a random manner to reduce vibratory impulses which might be imposed by the surfaces of the races.

3 Claims, 2 Drawing Sheets

BEARING SEPARATOR WITH RANDOM SPACING

TECHNICAL FIELD

This invention relates to ball bearings and more particularly to separators for randomly spacing the balls in the bearing to reduce lobing effects.

BACKGROUND OF THE INVENTION

Ball bearings are used to support the wheels of vehicles. The ball bearings have an inner race, an outer race and a plurality of balls housed in a separator or cage between the races. Ball race surfaces are machined in the inner and outer races. These surfaces are ground to provide close tolerances of size, surface finish and roundness. This will produce a smooth rolling surface for the balls. The grinding process can produce evenly spaced lobes, on either the inner or outer race, of very small amplitude and continue to be acceptable within the roundness tolerances. This lobing effect induces an impulse each time a ball passes over one of the lobes. This impulse can be significant when a number of lobes are simultaneously aligned with respective ones of the balls. Since the balls are evenly spaced in a separator, the impulse created thereby will be very significant if the number of lobes is a whole number multiple of the number of balls in the bearing.

The frequency of the impulses varies with the rotary speed of the wheel being supported. If the frequency of the impulses approaches the resonant frequency of the suspension system supporting the vehicle on the wheel, the induced vibration will become very noticeable in the form of noise and vibration. With the current technology in suspension design, the elements of the suspension tend to be lighter and stiffer.

One solution that has been proposed and is in use is the imposition of tighter tolerance limits on the roundness specification of the races. This tolerance tightening results in the need for one-hundred percent (100%) inspection on a tracing apparatus. This is an expensive procedure and is not practical in a high volume manufacturing environment. In lieu of this procedure, periodic inspections are performed to insure the process is under control. However, this can miss some bearing races with excess lobing.

SUMMARY OF THE INVENTION

It is an object of the present invention to provide an improved ball bearing having reduced lobing effect.

In one aspect of the present invention, the balls are randomly spaced around the circumferences of the races. In another aspect of the present invention, the pockets of the separator are not evenly spaced. In yet another aspect of the present invention, design criteria such as nominal chordal distance, pitch circle diameter of the balls, number of balls in the complement and the diameter of the separator pocket are evaluated to determine the ball spacing.

In a further aspect of the present invention, a minimum distance between adjacent balls is established to permit a structurally sound separator. In a yet further aspect of the present invention, the chordal distance which is greater than the minimum distance between adjacent ball pockets is determined by using randomizing techniques. In a still further aspect of the present invention, the minimum distance is added to each calculated random distance to determine the desired chordal distance between adjacent pockets.

DESCRIPTION OF AN EXEMPLARY EMBODIMENT

Figure 1:
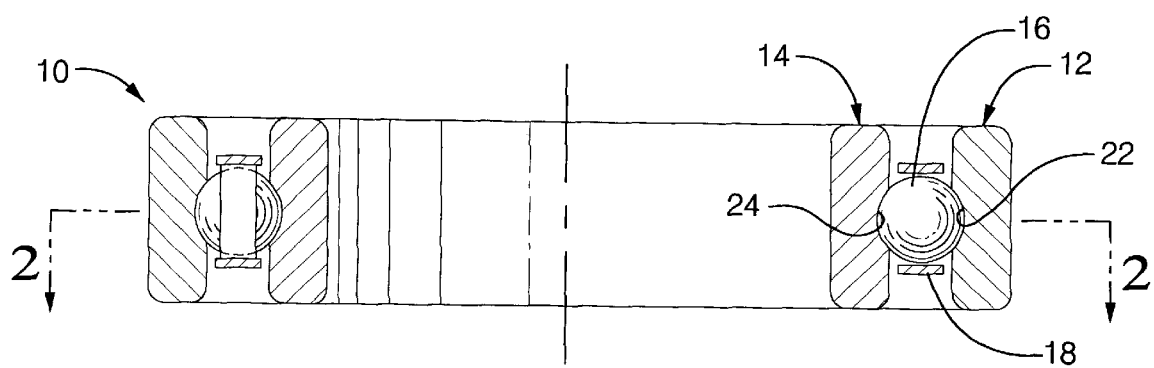
FIG. 1 Is a sectional elevational view of a ball bearing incorporating the present invention.
Figure 2:
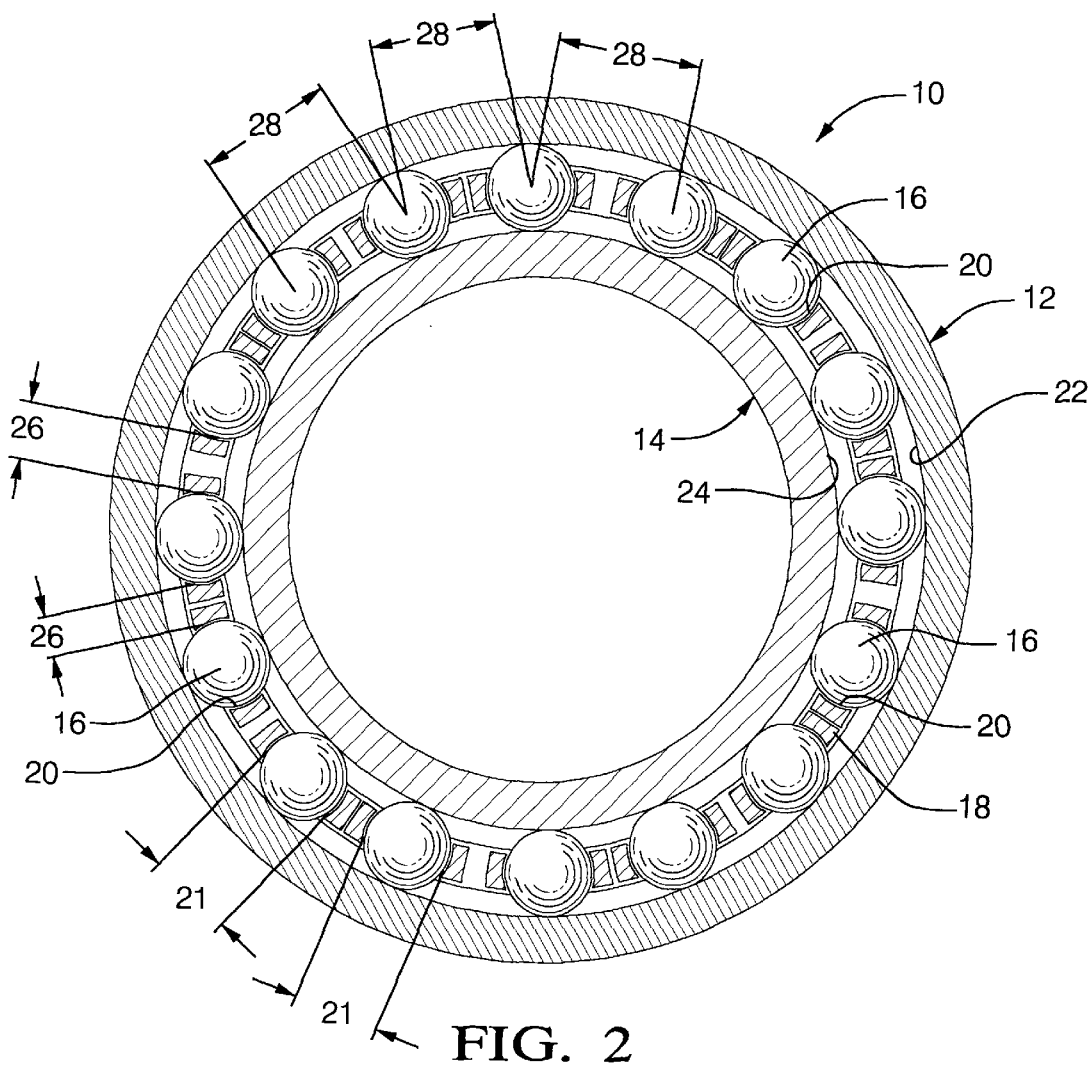
FIG. 2 is a view taken along line 2—2 in FIG. 1.
Figure 3:
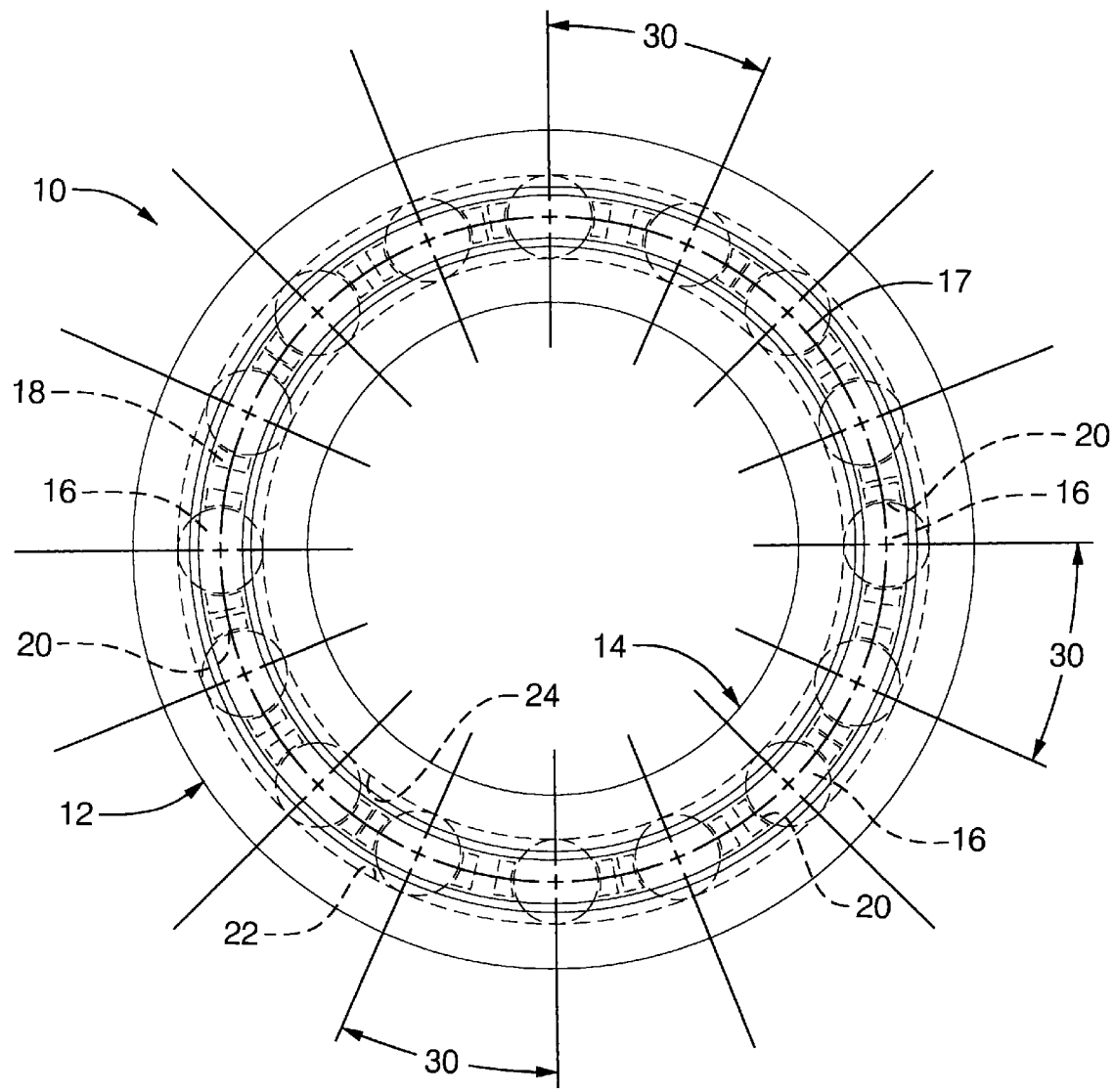
FIG. 3 is a view similar to FIG. 2 illustrating the angular disposition of the balls in the separator.

Referring to the drawings wherein like characters represent the same or corresponding parts throughout the several views, there is seen a ball bearing assembly 10 having an outer race 12, an inner race 14 and a complement of balls or spheres 16. The balls 16 are spaced circumferentially between the outer race 12 and the inner race 14 at a pitch circle 17 by a separator or cage assembly 18.

The separator assembly 18 has a plurality of substantially spherical ball pockets 20 in which respective ones of the balls 16 are entrapped. The balls 16 roll freely within a diameter 21 of the pockets 20. The outer race 12 has an arcuate groove 22 and the inner race 14 has an arcuate groove 24. The balls 16 roll in the grooves 22 and 24 to permit a speed differential between the inner race 14 and the outer race 12.

Each pair of adjacent ball pockets 20 have a separator chordal distance 26 that maintain adjacent ball centers at a ball pocket chordal distance 28. The chordal distances 26 and 28 are random in length such that the balls 16 are radially disposed at random angular positions 30. With the random displacement incorporated into the bearing assembly 10, the noise effect which can occur within the race geometry tolerances of the races 12 and 14 are minimized.

The random spacing can be accomplished in the following manner.

Determine the nominal chordal distance between adjacent pocket diameters 21 in the separator 18 with the following equation:

$$y = E * \sin(180/N) - Dp;$$

where:
y=nominal chordal distance 20
E=pitch circle diameter 17
N=the number of balls 16 in the bearing assembly 10
Dp=the separator pocket diameter 21.

Establish a minimum chordal width 26 (w) which can be fabricated between ball pockets 20 for a structurally sound separator.

Determine the chordal distance (CD) available for distribution between ball packets 20 with the following equation.

$$CD = (y - w)(N)$$

Divide the chordal distance CD among the N chords using any of the well known standard randomizing techniques.

Add each random chordal distance Cdi to the minimum chordal width w to obtain the desired chordal distance 28 between adjacent pockets 20.

The following is an example of randomizing sixteen balls in a bearing assembly using the present invention to establish the spacing between ball 18. For this example, the spaces will begin with the ball 18A and proceed clockwise.

y=E*sin(180/16)−11.79
E=65.4259 given by design criteria
y=0.974
w=0.50
CD=(0.974−0.50)*16=0.474*16=7.584

Using a random number sequence (last sixteen) from page 311, Table 1 of Introduction to Engineering Statistics by Gutterman and Wilkes the following chordal distances are calculated.

| Position | Random multiplier (x) | CDi CD * x | Chordal Distance Cdi + w |
|---|---|---|---|
| 1 | 0 | 0 | .500 |
| 2 | 3 | .4461 | .9461 |
| 3 | 5 | .7435 | 1.2435 |
| 4 | 4 | .5948 | 1.0948 |
| 5 | 5 | .7435 | 1.2435 |
| 6 | 6 | .8922 | 1.3922 |
| 7 | 0 | 0 | .500 |
| 8 | 5 | .7435 | 1.2435 |
| 9 | 0 | 0 | .5000 |
| 10 | 1 | .1487 | .6487 |
| 11 | 4 | .5948 | 1.0948 |
| 12 | 5 | .7435 | 1.2435 |
| 13 | 1 | .1487 | .6487 |
| 14 | 1 | .1487 | .6487 |
| 15 | 7 | 1.0409 | 1.5409 |
| 16 | 6 | .8922 | 1.3922 |

The above table is an example only and is not intended to limit the invention to a specific set of random numbers. Also the random number can be generated by a computer program instead of a random table.

What is claimed is:

1. A ball bearing comprising:

an outer race having a groove formed thereon;

an inner race having a groove formed thereon;

a plurality of ball members disposed on a pitch diameter between said outer race and said inner race in rolling contact with said grooves in both said inner race and said outer race;

a separator member disposed between said inner race and said outer race and having a plurality of pockets housing respective ones of said ball members and positioning adjacent ones of said ball members at random chordal distances between said races in accordance with the following method:

determine a nominal chordal distance between said pockets;

establish a minimum chordal width between said pockets;

establish a total chordal distance available for distribution between said pockets;

establish individual chordal distances between adjacent ball in a randomizing manner; and increase said individual chordal distances by an amount equal to said minimum chordal width.

2. The ball bearing defined in claim 1 further wherein:

each pocket has a diameter;

said nominal chordal distance is determined in accordance with the following:

$$y = E * \sin(180/N) - Dp;$$

where y = the nominal chordal distance

E = said pitch circle diameter

N = the number of balls

Dp = said pocket diameter dimension;

said chordal distance available for distribution is determined as follows:

$$CD = (y - w)(N);$$

where

CD = chordal distance w = the minimum between adjacent pockets; and

CDi elements are established by a randomizing technique where:

CDi = individual random chordal distances; and each individual chordal distance is established by CDi+w.

3. A bearing comprising: an outer race and in inner race, a plurality of ball members disposed on a pitch diameter between said outer race and said inner race in rolling contact with both said inner race and said outer race, a separator member disposed between said inner race and said outer race and having a plurality of pockets housing respective ones of said ball members and positioning adjacent ones of said ball members at random chordal distances between said races in accordance with the following method: determine the nominal chordal distance between said pockets, establish a minimum width between said pockets, establish a total chordal distance available for distribution between said pockets, and establish individual chordal distances between adjacent ball in a randomizing manner.

* * * * *